United States Patent [19]

Scott

[11] Patent Number: 5,562,367
[45] Date of Patent: Oct. 8, 1996

[54] PRESSURE RESPONSIVE BI-DIRECTIONAL PNEUMATIC CONVEYANCE SYSTEM WITH A SINGLE PNEUMATIC SOURCE, AND PRESSURE GENERATOR ELEMENTS THEREFOR

[75] Inventor: Lowell Scott, Burlington, Ky.

[73] Assignee: Hamilton Air Products, Fairfield, Ohio

[21] Appl. No.: 311,750

[22] Filed: Sep. 23, 1994

[51] Int. Cl.⁶ .................................................. B65G 51/32
[52] U.S. Cl. ............................... 406/13; 406/16; 406/112
[58] Field of Search ................................. 406/13, 15, 16, 406/26, 110, 111, 112

[56] References Cited

U.S. PATENT DOCUMENTS

| 1,586,634 | 6/1926 | Maclaren et al. | |
| 3,711,038 | 1/1973 | Van Otteren | 406/112 |
| 3,738,592 | 6/1973 | Smith et al. | 406/112 |
| 4,189,260 | 2/1980 | Morano et al. | 406/112 |
| 4,189,261 | 2/1980 | Kelley et al. | 406/112 |
| 4,325,660 | 4/1982 | Jones | 406/112 |
| 4,352,603 | 10/1982 | Anders | 406/26 |
| 4,462,721 | 7/1984 | Anders et al. | 406/112 |
| 4,930,941 | 6/1990 | Willey et al. | 406/112 |
| 4,971,481 | 11/1990 | Foreman | 406/112 |
| 5,147,154 | 9/1992 | Scott | 406/112 |
| 5,211,513 | 5/1993 | Scott | 406/112 |
| 5,215,412 | 6/1993 | Rogoff et al. | 406/112 |

*Primary Examiner*—Gary C. Hoge
*Attorney, Agent, or Firm*—Beveridge, DeGrandi, Weilacher & Young, LLP

[57] ABSTRACT

A bi-directional pneumatic conveyance system which relies upon a single pumping element, and which bi-directionally conveys an item therethrough based upon the position of the item is disclosed. Such a system has plural stations, sensors for sensing pressures at a designated area in each station, a connective tube network pressure generator that includes a pneumatic source and a valve device for internally arranging such generator to create pressure or vacuum conditions within the network, depending upon the state of the pumping element and the internal arrangement of the valve assembly. A control device responds to pressure indications from the pressure sensors and to operator commands in order to control the valve assembly and the pumping element to selectively depressurize and pressurize the tube network and thereby convey the carrier. A terminal station for use in such a pneumatic conveyance system also is disclosed, together with each of a pressure generation apparatus, and a controllable pressurization apparatus that are suitable for use in such a terminal.

34 Claims, 8 Drawing Sheets

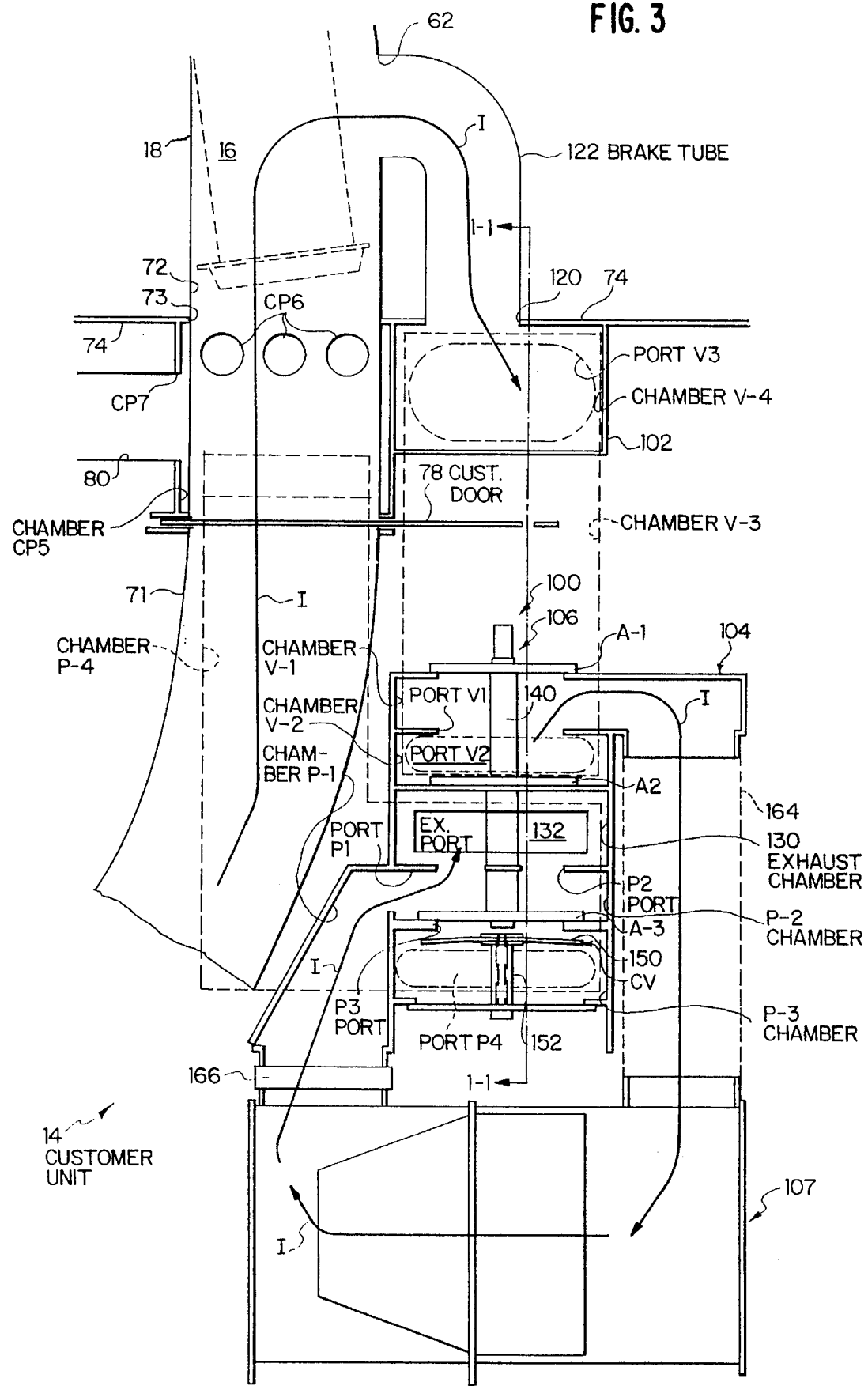

PRESSURE RESPONSIVE BI-DIRECTIONAL PNEUMATIC CONVEYANCE SYSTEM WITH A SINGLE PNEUMATIC SOURCE, AND PRESSURE GENERATOR ELEMENTS THEREFOR

BACKGROUND OF THE INVENTION

The present invention relates to bi-directional pneumatic conveyance systems, terminal stations therefor, and pressure generation elements therefor. More particularly, the present invention relates to a composite pneumatic conveyance system, a terminal station for use in such a pneumatic conveyance system, a pressure generation apparatus for such a terminal, and a controllable apparatus for carrying out airflow control for such a pressure generating apparatus.

Conventional commercial pneumatic tube conveyance or transportation systems have required two or more pumping elements in order to generate vacuum conditions and pressurization conditions within the pneumatic tube network. Vacuum or depressurization, and pressurization conditions, of course, are required in order to effect conveyance of a carrier to-be-transported between stations of the system. The cost and complexity of such transportation systems, depend in large part, upon the number of pump elements that are required for effective operation of the system. Accordingly, configuration of such a system to have only a single pumping element is desirable.

Also, conventional systems typically are controlled according to time. That is, in such a conventional system, when the carrier is first sent from a sending station to a receiving station, a clock mechanism deactivates the pumping elements for the system, and opens access doors at the receiving station after a predetermined time interval. The predetermined time interval is based upon the time that normally is required for the carrier to traverse the distance from the sending to the receiving stations. Such a timing control implementation is subject to problems where the system temporarily has been disabled as by a local power failure. In such conditions, the carrier could be left stranded anywhere in the tube network, and transport of the carrier therefore would not agree with the system's preset timing.

Examples of conventional elements for conventional by-directional pneumatic transportation systems are provided by various U.S. patents. For example, the assignee's U.S. Pat. No. 5,147,154 shows a pressure regulation device that includes a valve assembly which cooperates with an air dam in order to control pressure within a pneumatic tube system connected to such apparatus. The apparatus disclosed in this patent relies upon two pumping elements and the valve assembly and air dam in order to accomplish pressure regulation.

U.S. Pat. No. 4,971,481 specifically relates to a pneumatic carrier stop device. When the carrier passes over certain vents in the transport tube, the carrier redirects airflow in the system to facilitate capture of the carrier for operator removable. This patent is understood to show a carrier terminal that includes a single chamber housing which has a movable, multi-plunger device provided therein. The plunger is responsive to air flow directed into the housing. Control of airflow into the system depends upon the position of the carrier to the extent that the carrier blocks the vents in the system tubing to redirect pressurized air into the housing; this in turn determines the position of the multi-plunger. Various entrances and exhausts in the housing, and an airline connection between the housing and the upper portion of the transport tube are disclosed.

U.S. Pat. No. 1,586,634 relates to a control device for a pneumatic carrier delivery system. The control device is understood as a cylindrical housing having a movable plunger provided therein. The housing also includes a fixed partition and several vent structures. As a carrier traverses through the tubing of the system, the plunger adjusts to maintain proper pressure within the system.

SUMMARY OF THE INVENTION

The present invention provides a pneumatic conveyance system, and key pressure control elements for such a system. The present invention attains both desired goals of requiring only a single pneumatic pumping source for the system, and carrying out system control based upon movement of the carrier through the tube network thereof. The conveyance system, terminal station, pressure generation apparatus and controllable pressure generation apparatus in accordance with the invention are ideally suited for use as, and use in, a bank pneumatic conveyor for transport of a bank tube carrier between a teller station and at least one customer station. The present invention features a structure of chambers and a valving mechanism that is movable to selectively permit and prohibit communication between the multiple chambers. From the preferred embodiments, it is seen how such interior chamber structure and valve mechanism cooperate with a single pumping element in order to either depressurize or pressurize a connected tube network. The interior chambers define two distinct passages through the pressure generation apparatus. In the preferred embodiments, these channels are referred to as the pressure and vacuum chambers respectively. They are connected to each other on either side of the single pumping element. Communication between the plural chambers of each of the channels is controlled by the valve device. In the preferred embodiment, the valve means is a multi-disc spool valve assembly.

By this invention, the inventor provides, as an alternative to the timing control scheme for pneumatic transportation systems, one that involves control of depressurization and pressurization of the system based upon carrier position. Conveyance control based upon carrier position within the tube network is derived from sensors that sense pressure conditions within designated areas within each station. The inventor has arranged his system such that when the carrier approaches a station, the carrier compresses air in front of it, in the designated area of the station as the carrier enters that area. Pressure sensors placed in communication with the station area thus sense the carrier's arrival and provide signals to a control circuit accordingly. According to the preferred embodiments, the control circuit deactivates the pumping element upon receipt of signals from the sensors that indicate carrier arrival. Meanwhile, the compressed air provides a cushion that slows the carrier as it enters the station. Then, when the carrier comes to rest within the station, such as when the carrier touches a station door, the pressure increase within the designated area vanishes. Again, a sensor detects this change and indicates the pressure change to the control circuit. As mentioned, the control circuit controls the pumping element, namely the activation and deactivation thereof. It also controls opening and closing of the doors of the network stations, and the position of the valve means, within the interior of the pressure generation device. The valving device configures the internal structure of the pressure generation to either depressurize or pressurize the tube network merely upon activation of the pumping element. Thus, only one pumping element is required, and it can remain fixed within the system.

As will be seen from the preferred embodiments, the system in accordance with the present invention also employs atmospheric pressure to help move the carrier within the network. In order to send the carrier from the station at which the pressure generation apparatus is connected to the network, the control means controls the pumping element and pressure generation apparatus in order to create a vacuum in the tube network in front of the carrier. Thus, atmospheric pressure entering the station from beneath the carrier begins to move the carrier out of such station. Then, for example when the door of that station is closed, the control means causes a pressurizing air stream to enter the tube network from that station in order to propel the carrier through the network to another station. The control means, of course, responds to commands from an operator, as well as signals from the sensors.

The system, and elements of the present invention, along with the control device therefore, has been developed with the possibility of power failures in mind. Such power failures interrupt service and may leave the carrier "stranded" at any position within the network. The system of the present invention provides for a simple procedure by which an operator can operate the system to return the carrier to a central i.e. teller station regardless of where the carrier happened to be at the time of power failure. The system of the present invention thus provides a low-cost system, relying upon only one pumping element, which system is highly reliable and bases system control on carrier position so that it is capable of returning the carrier to the system operator, regardless of where the carrier is in the system at the time that conveyance is commanded by the operator.

In summary, a bi-directional pneumatic conveyance system for conveying an item between stations of the system comprises:

a first station having a first interior structure that defines a first area to receive and hold the item;

a first pressure sensor for sensing pressure within the first area and providing an indication indicative thereof;

a second station having a second interior structure that defines a second area to receive and hold the item;

a second pressure sensor for sensing pressure within the second area and providing an indication indicative thereof;

a pneumatic tube network for connecting the first and second stations;

a pressure generation means connectable to the tube network at the second station for depressurizing and pressurizing the tube network, the pressure generation means includes a pneumatic source and valve means for internally arranging the pressure generation means to depressurize the tube network when the pneumatic source is activated and the valve means is in a first position, and for internally arranging the pressure generation means to pressurize the tube network when the pneumatic source is activated and the valve means is in a second position; and control means, responsive to pressure indications from the first and second pressure sensors, for controlling the pump and the valve means of the pressure generation means in order to selectively depressurize and pressurize the tube network.

A terminal station, for use in a pneumatic conveyance system including plural stations and a tube network connecting its stations, comprises:

a housing having an interior structure for receiving a carrier from the tube network of the pneumatic conveyance system, the interior structure defines an area which is in communication with the tube network and which undergoes pressure increases therein as the carrier enters the area from the tube network, and pressure decreases as the carrier passes through the area;

high and low pressure generation means connectable to the tube network and to a single pneumatic source for selectively depressurizing and pressurizing the tube network in order to convey the carrier therein;

sensor means for sensing pressure within the area and providing an indication thereof, and control means, responsive to an indication from the sensor means, for controlling the pressure generation means and the pneumatic source so as to depressurize and pressurize the tube network.

A pressure generation apparatus, for use in a pneumatic conveyance system including plural stations and a tube network connecting the stations, comprises:

means defining a first enclosed area;

means providing communication between the first enclosed area and a location in one of the stations, which location receives and holds a conveyance item;

means for sensing pressure in the enclosed area and providing an output signal indicative thereof;

means defining a second enclosed area;

valve means located in the second enclosed area and movable therein between a first position and a second position;

means defining a third enclosed area which communicates with the second enclosed area and which is communicable with the first enclosed area through the valve means;

a single pump means located in the third enclosed area; and control circuit means, responsive to an output signal from the sensing means, for controlling activation of the pump means and movement of the valve means between the first and second positions to selectively depressurize and pressurize a tube network connected to the said one of the stations.

A controllable apparatus, for directing airflow from a single pneumatic pumping source to selectively depressurize and pressurize the tube network of a bi-directional pneumatic transportation system that includes terminal stations, comprises:

housing means, the housing means having an outlet connectable to a bi-directional pneumatic transportation system station, the housing means defining a pressurization channel provided by a first plurality of chambers and ports therebetween, a vacuum channel provided by a second plurality of chambers and ports, and an exhaust chamber connectable to at least one of the chambers of the pressurization channel, the pressurization and vacuum channels being connectable to pressure and vacuum sides of the single pneumatic pumping source respectively; and valve means located in the housing, the valve means having a first condition wherein it connects the at least one pressurization channel chamber to the exhaust chamber and isolates another pressurization channel chamber from the at least one chamber, and wherein it connects all of the vacuum channel chambers in communication whereby the apparatus cooperates with the single pneumatic source to create a vacuum at the outlet by discharging air through the exhaust chamber, and a second condition wherein it isolates the at least one pressurization channel chamber from the exhaust chamber and connects the at least one pressurization channel chamber and the another pressurization channel chamber, and wherein it isolates at least two of the vacuum channel chambers from each other whereby the apparatus cooperates with the single pneumatic source to create pressure at the outlet.

BRIEF DESCRIPTION OF THE DRAWINGS

Further aspects and features of the present invention will be even more apparent from the following detailed description and drawings, and the appended claims. In the drawings:

FIG. 3 is a schematic side view, similar to FIG. 2, that illustrates important elements in the customer station of the system of FIG. 1;

DETAILED DESCRIPTION OF THE PREFERRED EMBODIMENTS

Figure 1:
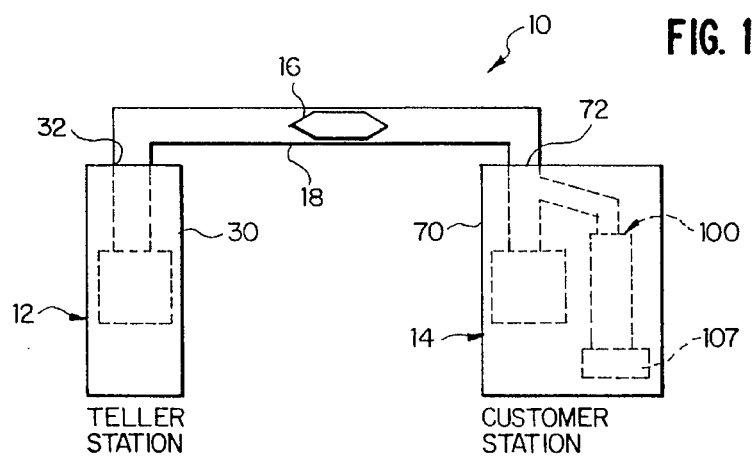
FIG. 1 is a schematic block diagram of a bank teller carrier system incorporating the pneumatic transportation system in accordance with the present invention.

FIG. 1 schematically depicts a bi-directional pneumatic transportation system 10 in accordance with the present invention. System 10 is presented in the form of a bank teller network, but, it should be apparent that the transportation system elements disclosed herein are applicable to other pneumatic transportation tasks. System 10 is shown to have a teller station 12 connected to a customer station 14. A carrier 16 is depicted as being transported within a carrier tube network 18. Additional teller and customer stations are contemplated in a network for typical banks.

As between the two stations 12 and 14, teller station 12 is comparatively simple and thus will be described first. As seen schematically from FIGS. 1 and 2, it has a housing 30 with an inlet 32 that connects to tube carrier network 18. Housing 30 also contains an interior wall structure 34 which defines a chamber TP-5 therewithin. Chamber TP-5 has an opening 35 at its upper region for receipt of an end portion 37 of tube 18, and a door 36 located at its lower portion for closing off tube end portion 37 to stop and catch the carrier. Preferred chamber TP-5 also has various ports, with ports TP6 providing communication between chamber TP-5 and tube end portion 37, and ports TP8 and TP9 connecting this chamber to a teller-side pressure switch mechanism PS2. The interior wall structure 34 for chamber TP-5 also provides ports TP8 and TP9 necessary for operation of teller-side pressure switch PS2.

Figure 9:
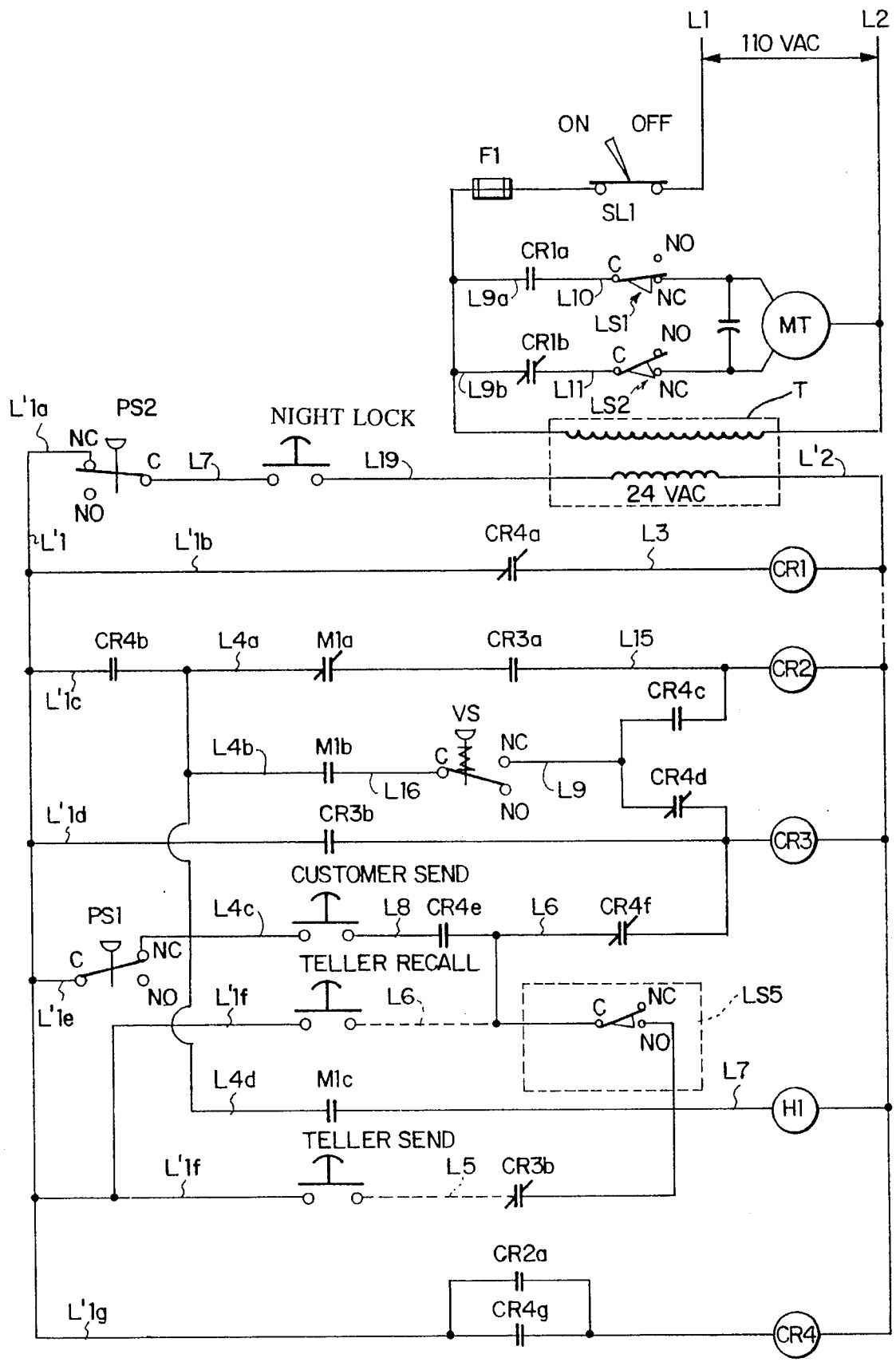
FIG. 9 is a circuit diagram of an operational control circuit suitable for use in controlling the pneumatic transportation system in accordance with the present invention.

Pressure switch PS2 can be any arrangement responsive to pressure present at port TP7. As apparent to those of ordinary skill in the art, switch PS2 could comprise a commercially available unit, or depending upon the interior mounting structure, could be developed as needed to fit into a particular housing. Development of such a switch is well within the capability of those of ordinary skill in the art. In preferred system 10, each of pressure switches PS2 and PS1 (on the customer side), and (customer-side) vacuum switch VS includes a switch housing 40 that contains the electrical switch contact hardware, an arm and disc assembly 42, and a transmission element 44 for transmitting the position of the assembly 42 to electrical components in the switch housing 40. In low pressure conditions, and when system 10 is off, switch PS2 is in the position shown in FIG. 2, with assembly 42 fully extended to close port TP8. Correspondingly, the position of the electrical contacts of PS2 are as shown in FIG. 9. High pressure conditions at ports TP7 and TP8 however will push disc assembly back (to port TP9) and change the position of the electrical contacts contained in housing 40.

Figure 10:
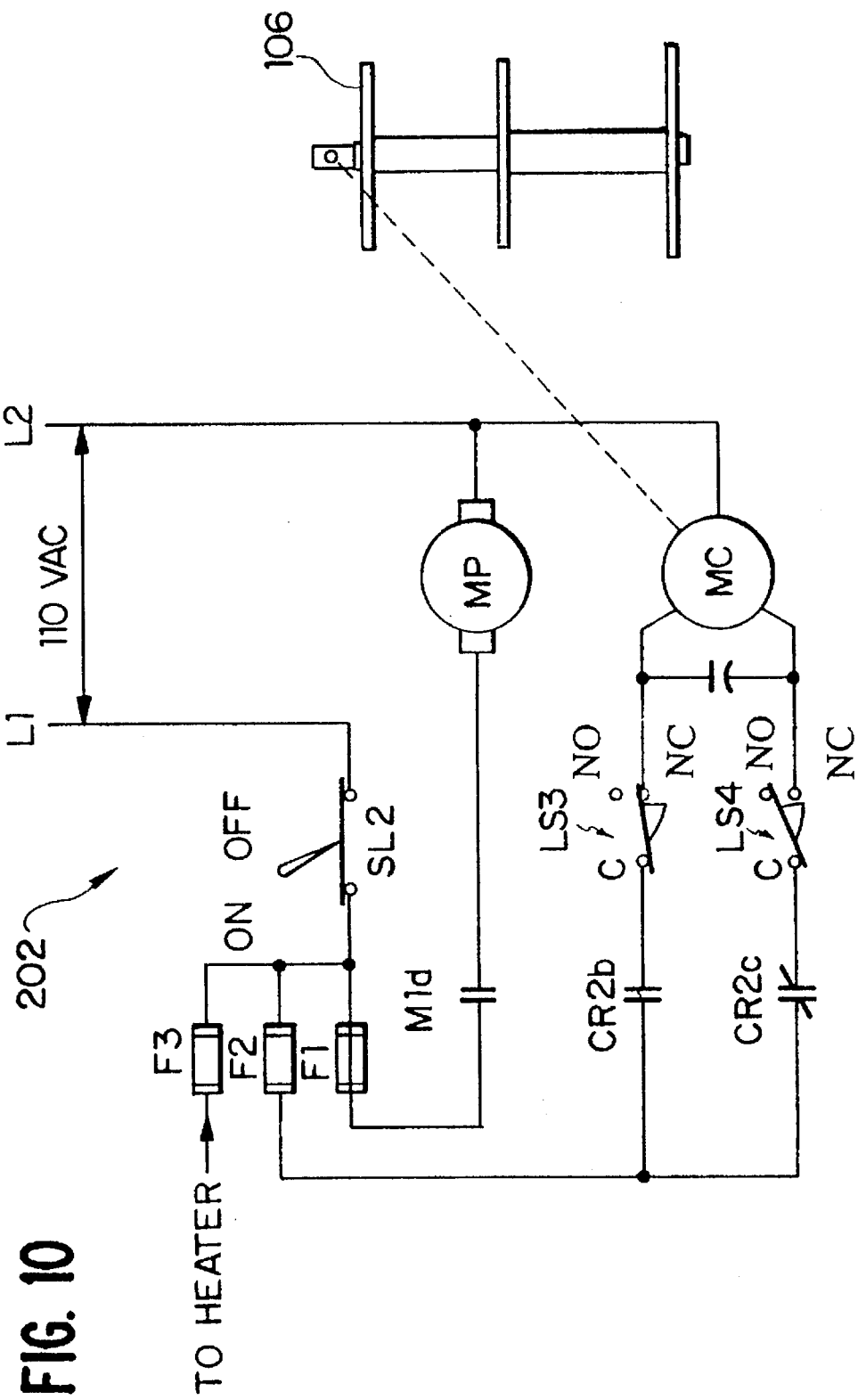
FIG. 10 is a circuit diagram of a circuit controlled by the main circuit of FIG. 10 for activating and deactivating the pump motor and customer door motor of the exemplary bank transportation system of FIGS. 1 through 9.

With a brief look forward to FIGS. 9 and 10, these figures show each of preferred switch PS2, PS1 and VS as three-pole, two-position switches. Each of preferred switches PS2, PS1 and VS includes a MICROSWITCH (trademark) No. BZ-2RW82-A2 type three-pole, two-position switch mechanism in preferred system 10. Indeed, this is the same switch that also is used to implement each of five limit switches LS1, LS2, LS3, LS4, and LS5 in a commercial embodiment of the invention. Customer-side pressure switch PS1 is identical to teller-side switch PS2 and responds to high pressure introduced through port CP7 in exactly the same way as switch PS2. Customer-side vacuum switch VS also is identical to the pressure switches PS2 and PS1, except for one different feature. Switch VS has a coil spring 46 which retracts its arm and disc assembly 42 to close over port CP9a when system 10 is off. When system 10 is on and tube network 18 depressurized, relatively higher pressure from behind assembly 42 of switch VS overcomes the force of spring 46 and causes arm/disc assembly 42 to extend out to cover port CP8a. This is the way vacuum switch VS responds to low pressure conditions at port CP7. Of course, when the arm/disc assembly 42 changes position, so do the electrical contacts housed within switch VS.

Carrier tube 18 also is of any conventional type and material. Tube 18 has two notable features. One is the flap check valve 60 located in proximity to teller station 12. The other is the brake tube connection port 62 that connects the tube 18 with a brake tube. Both of these features will be understood from the following.

Figure 4:
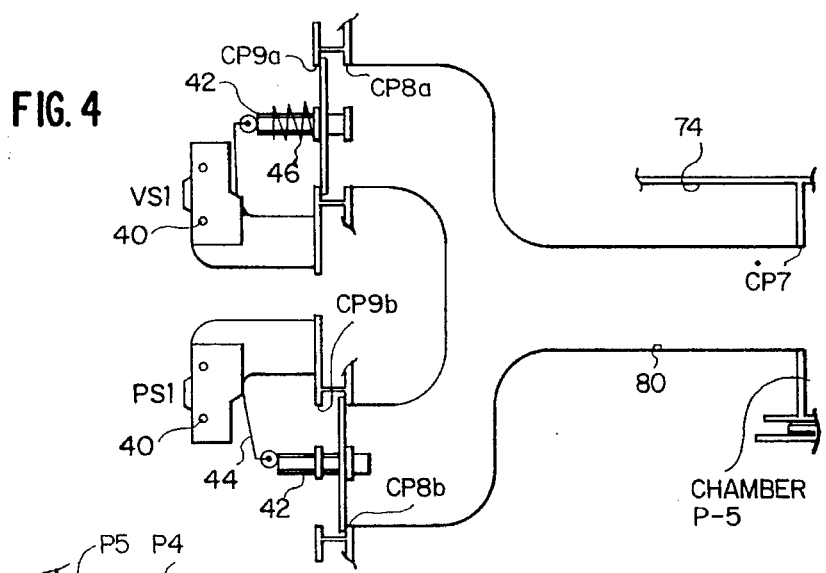
FIG. 4 is a side view of an arrangement of pressure and vacuum switches, and their connective tubing, suitable for use with the customer station arrangement of FIG. 3.

In the embodiment of FIG. 1, customer station 14 is shown to include the structure for accomplishing transport of the carrier 16 between the teller and customer stations 12, 14. However, those of ordinary skill should readily appreciate that such structure could just as readily be arranged at the teller station 12, to accomplish the same function. With reference to FIGS. 1, 3 and 4, customer station 14 also has a housing 70. Housing 70 receives the carrier 16 and provides for access of the carrier by a customer. Housing 70 also contains the pneumatic drive or propulsion structure for system 10.

Carrier tube system 18 connects to customer station housing 70 at a housing inlet portion 72 which receives an end portion 71 of tube 18. There, housing 70 has an interior wall structure 74 which defines a chamber CP-5 that surrounds tube end portion 71. Chamber CP-5 also has an opening 73 through which tube portion 71 extends to where it is obstructable by a door mechanism 78 below. Chamber CP-5 also communicates with other elements within housing 70 by a number of ports. An area that is depicted as including three ports CP6 directly connects chamber CP-5 with carrier tube 18. Of course, ports CP6 might actually have only one, two or a different number of ports as is plain to those of ordinary skill in the art. (The same is true for ports TP6 of teller station chamber TP-5). Meanwhile, with particular reference to FIG. 4, port CP7 connects chamber CP-5 with customer-side pressure switch PS1 and vacuum switch VS, via an internal passage 80. As mentioned above, each of switches PS1 and VS also has a valve disc assembly 42 that moves between two ports, namely ports CP8a and CP9a for switch VS and ports CP8b and CP9b for switch PS1. Interior structure 74 provides valve seats and the like for switch mechanisms PS1 and VS.

Figure 6:
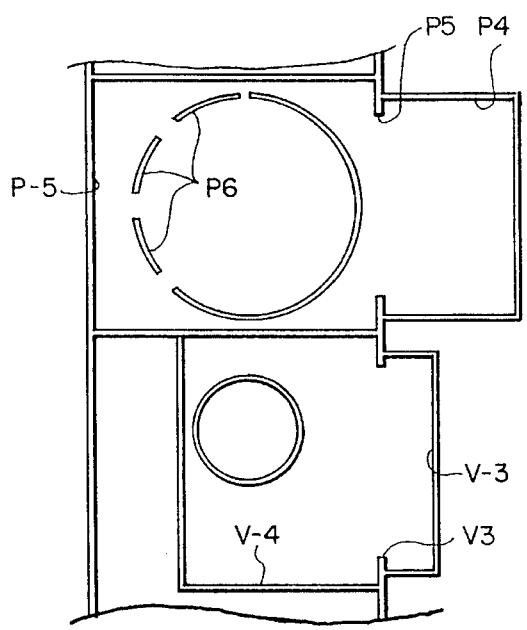
FIG. 6 is a downwardly-looking view, along line 2—2 of FIG. 5 of the pressure generation arrangement.
Figure 5:
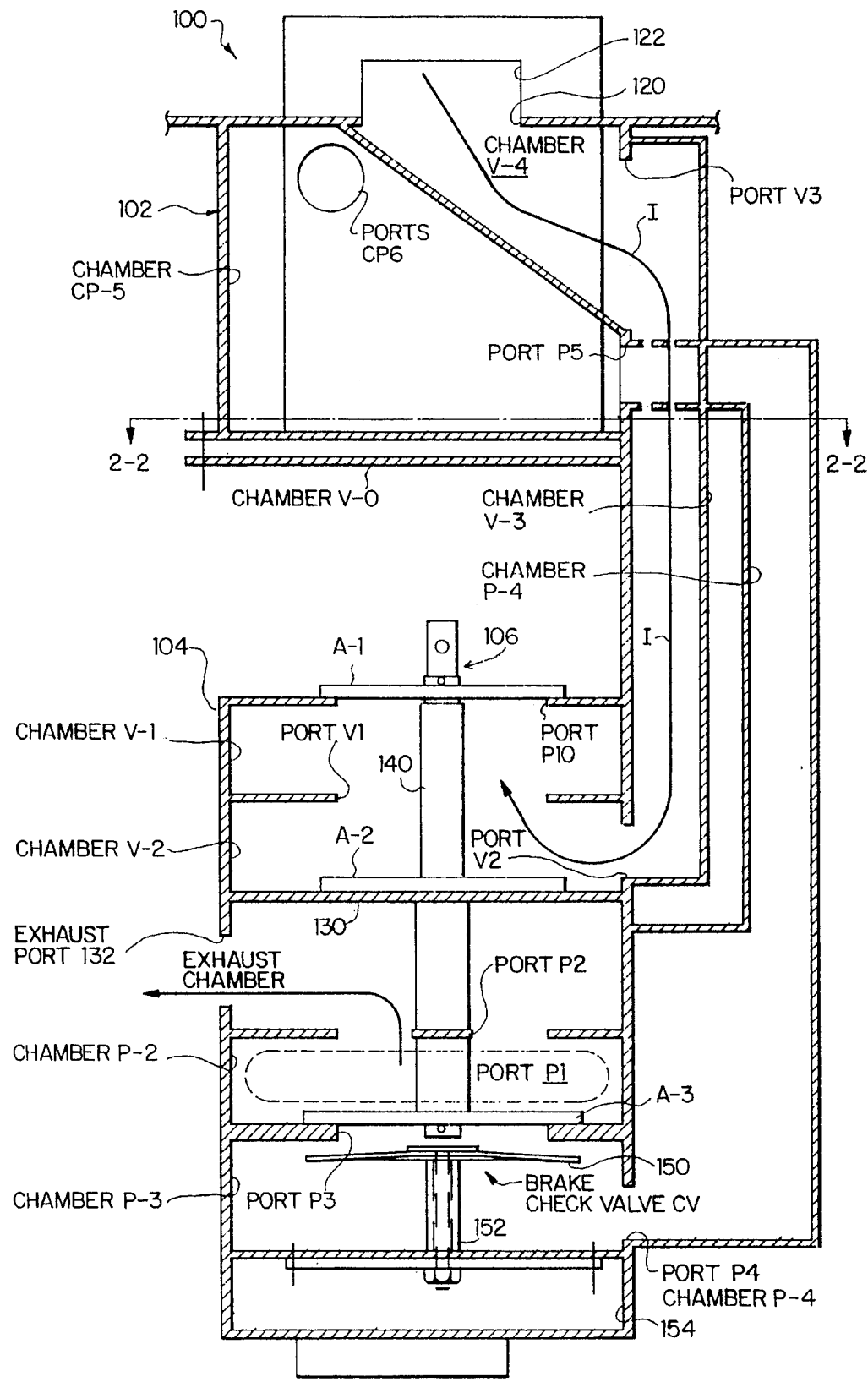
FIG. 5 is a view along line 1—1 of FIG. 3 of part of the pressure generation arrangement of the customer station.

FIGS. 3, 5 and 6 show different views of the high pressure and low pressure (vacuum) generation section 100 for transportation system 10. Pressure generation section 100 includes an upper section 102, a central section 104 which contains a spool valve assembly 106, and a lower section 107 that houses a single pump unit 108. In the preferred embodiment, upper section 102 has a port 120 that communicates with the carrier tube 18 through the brake tube connection port 62 (briefly mentioned in the foregoing) and the brake tube 122 that extends between ports 62 and 120. Section 102 provides a chamber V-4 connected to brake tube 122. Chamber V-4 in turn communicates with vertically extending chamber V-3, through port V3. Chamber V-3, via port V2, communicates with a chamber V-2, which in turn communicates with a chamber V-1 thereabove, through port V1. Chambers V-4, V-3, V-2, and V-1 generally are referred to as vacuum channel chambers, hence V-4, V-3, etc. which together with their connective ports make up a "vacuum channel" of the pressure/vacuum generator 100.

Meanwhile, chamber CP-5 communicates with a likewise vertically-extending chamber P-4 through port P5. Chamber P-4 extends parallel to chamber V-3 and reaches to a lowermost chamber P-3 in section 104. Another chamber P-2 is located above chamber P-3 whereby, depending upon the position of the valve assembly 106, chambers P-2 and P-3 are in communication through port P3. Chamber P-2 has a port P2 which leads to the exhaust chamber 130 and from there to the exhaust port 132. Likewise, chambers CP5, P-4, P-3, P-2, and P-1 can be referred to as the pressurization channel chambers that make up a "pressurization channel" with their respective connective ports.

Spool valve assembly 106 has an upper valve disc portion A-1, an intermediate valve disc portion A-2, and a lower valve disc portion A-3, all connected in series by a stem 140. Upper valve disc A-1 regulates communication between chamber V-1 and the atmosphere through port P10 and a "chamber" V-0 that is open to the atmosphere as best seen from FIG. 5. In FIGS. 3 and 5 through 7, valve assembly 106 is shown in its down or rest position such that valve disc A-1 obstructs port P10. In this position, intermediate disc A-2 leaves port V1 unobstructed while lower disc A-3 holds port P3 closed and leaves port P2 open. At this time, a brief reference is made to FIGS. 7 and 8 where valve assembly 106 is shown in its up or actuated position whereby it opens ports P10 and P3 while it closes ports V1 and P2. In preferred system 10, customer door 78 is mechanically connected to valve assembly 106 so that the door lifts assembly 106 to the up position shown in FIGS. 7 and 8 when the door fully closes. Again skipping to FIG. 10, we generally show this linking by dotted lines connecting a customer door motor MC and spool valve 106. Those of ordinary skill appreciate that any conventional linking between door 78 and assembly 106 can be made to accomplish this function. Indeed, connection between these two elements is optional and as will be understood from the following, any manner of lifting assembly 106 at a particular time will suffice. Detailed reference to FIGS. 7 and 8 and the affect of lifting of valve assembly 106 will be made during the description of operation.

Those of ordinary skill in the art also should appreciate that valve arrangements other than the particular spool valve 106 shown herein could suffice. For instance a two-disc spool valve could be employed within chambers V-2 and V-1, and a different valve element employed to control the open and closed state at port P-3 between chambers P-2 and P-3. Also, if the pressurization channel chambers and the vacuum channel chambers are modified in a way apparent to those of ordinary skill in the art to perform the same functions, still other valve arrangements might be found suitable.

Chamber P-3 also contains a brake check valve assembly CV. Brake check valve CV has a flexible flap 150 that is positioned within chamber P-3 by a mounting assembly 152. Check valve CV also regulates air flow through port P3 by flexibly responding to pressure within chambers P-2 and P-3.

A lower, pump housing section 107 communicates with the remainder of pressure generation section 100 by conventional hose connections. Pump 108 is situated within section 107 so as to define a vacuum region 160 behind it and a pressure region 162 in front. A first hose 164 (shown in phantom lines for clarity) forms a chamber which connects chamber V-1 to vacuum region 160, while a second hose 166 connects pressure region 162 to chamber P-1. Pump 108 is a single pumping element that draws in air at rear region 160 and forces it out to create an air stream in front region 162. In the preferred embodiments, the pump 108 is fixed as shown, and it is left solely to spool valve 108 to internally connect and isolate the chambers of the pressurization channel and vacuum channel to arrange generator 100 to depressurize or pressurize tube 18. Also, within section 107, the pressurization and vacuum channels are separated from each other in the sense that they are connected through pump 108 by the communication between vacuum channel chamber V-1 and vacuum region 160, and the communication between pressurization channel chamber P-1 and pressure region 162.

FIGS. 9 and 10 show a preferred circuit arrangement for controlling system 10. FIG. 9 shows the main circuit 200 for system control. FIG. 10 shows a circuit 202 dedicated to controlling the pump motor MP, and the customer door motor MC. This control circuit 202 also is regulated by main control circuit 200.

With particular reference to FIG. 9, incoming power is present on line L1 through a master ON/OFF switch SL1 and a transformer T. Through transformer T, power line L1 applies power to line L'1 which has branch lines L'1a, L'1b, L'1c, L'1d, L'1g, L'1f, and L'1e that originate at nodes along line L'1. Beneath transformer T, line L'2 designates ground. At branch line L'1a, teller side pressure switch PS2 schematically is shown as a 3 pole, 2-position switch with branch line L'1a connected to the NC (normally-closed) contact of switch PS2. The (non-movable) C contact of switch PS2 is connected to a terminal of an operator-manipulable Night Lock switch over line L7. The other terminal of the Night Lock switch is connected by line L19 to transformer T.

Preferred main control circuit 200 includes five different relay coils which are identified as CR1, CR2, CR3, CR4 and M1. Coil M1 hereinafter will be referred to as the contactor coil. Over branch line L'1b, a normally-closed contact CR4a of coil CR4 regulates supply of power to coil CR1 over line L3. A normally-open contact CR4b of coil CR4 is located between branch line L'1c and parallel branch lines L4a, L4b, L4c, and L4d. When normally-open contact CR4b is closed by activation of coil CR4, power is supplied to each of branch lines L4a, L4b, L4c, and L4d. Along line L4a, normally-closed contact M1a is connected to normally-open contact CR3a, which in turn is connected to coil CR2. Along line L4b, normally-open contact M1b is connected to the nonmovable C contact of the two-position vacuum switch VS over line L16. The normally-closed NC contact of vacuum switch VS is connected to a parallel array of contacts controlled by coil CR4, on line L9. A normally-open contact CR4c is located between line L9 and line L15 in front of coil CR2 while a normally-closed contact CR4d of coil CR4 is between line L9 and coil CR3. At the same time, line L'1d connects to coil CR3 through normally-open contact CR3b when contact CR3b is closed.

Line L4c includes the "Customer Send" control switch which, by line L8, is connected to normally-open contact CR4e over line 8. Line L6 connects normally-open contact CR4e to normally-closed contact CR4f, which is in turn connected to normally-closed contact CR4d. Line L4d is connectable to line L7 and coil M1 through normally-open contact M1c. Line L'1f leads to a "Teller Recall" switch control and then to a nonmovable contact C of a special purpose customer door-open limit switch LS5 which also is a 3-contact, 2-pole switch. The normally-open NO contact of limit switch LS5 also is connected to line L7. Line L4c is connected to the normally-closed contact NC of customer-side pressure switch PS1, the nonmovable contact C of which is connected to branch line L'1e. At branch line L4d, line L7 is connectable to line L4d through normally-open contact M1c. Line L7 includes branches from the normally-open contact NO of limit switch LS5, normally-open contact M1c, and a normally-closed contact CR3b associated with coil CR3. These branches of line L7 lead to the coil M1. Finally, line L'1f connects to line L5 through the "Teller Send" switch control. Line L5 is connectable to line L7 through normally-closed contact CR3b.

At the bottom of FIG. 9, branch line L'1g is seen to connect to a parallel arrangement of normally-open contact CR2a and normally-open contact CR4g. When either of normally-open contact CR2a or normally-open contact CR4g is closed, line L'1g is connected to coil CR4 to provide power to this coil.

Teller door motor control is achieved by the circuit at the top of FIG. 9. Incoming power arrives over line L1 through master switch SL1 (and fuse F1) so that it is present on branch L9a, and branch line L9b. Otherwise, line L1 continues to transformer T which transforms 110 VAC to 24 VAC for use by the remainder of preferred control circuit 200. Line L9a is connectable to line L10 through a normally-open contact CR1a. Line L10 connects to the non-movable contact C of teller door-open limit switch LS1. The normally-closed contact NC of limit switch LS1 is connected to teller door motor MT. Meanwhile, line L9b is connectable to line L11 through normally-closed contact CR1b. Line 11 is connected to the nonmovable contact C of a teller door-closed limit switch LS2. The normally-closed contact NC of limit switch LS2 also is connected to the teller door motor MT. It is seen that coil CR1, together with limit switches LS1, LS2, has immediate operative control over the teller door 36.

With respect to FIG. 10, incoming power again proceeds through a master switch SL2 through a fuse F1 to normally-open contact M1d, and through another fuse F2 to a parallel array of limit switches LS3, LS4 for the customer door motor MC. Normally-open contact M1d connects to the pump motor MP. Customer door-open limit switch LS3 is connectable to power line L1 by normally-open contact CR2b, through line L17. Line L17 connects to the nonmovable contact C of limit switch LS3. The normally-closed contact NC of limit switch LS3 is connected to customer door motor MC. Meanwhile, customer door-closed limit switch LS4 is connected through normally-closed contact CR2c via line 11 which is tied to the nonmovable contact of limit switch LS4. The normally-closed contact NC of limit switch LS4 also is connected to customer door motor MC.

Operation of system 10 will be discussed by first describing the procedure by which the teller sends the carrier 16 from teller station 12 to a customer awaiting receipt at customer station 14. Thereafter the "Teller Recall" or "Customer Send" procedure will be described with respect to FIGS. 7 and 8.

Figure 2:
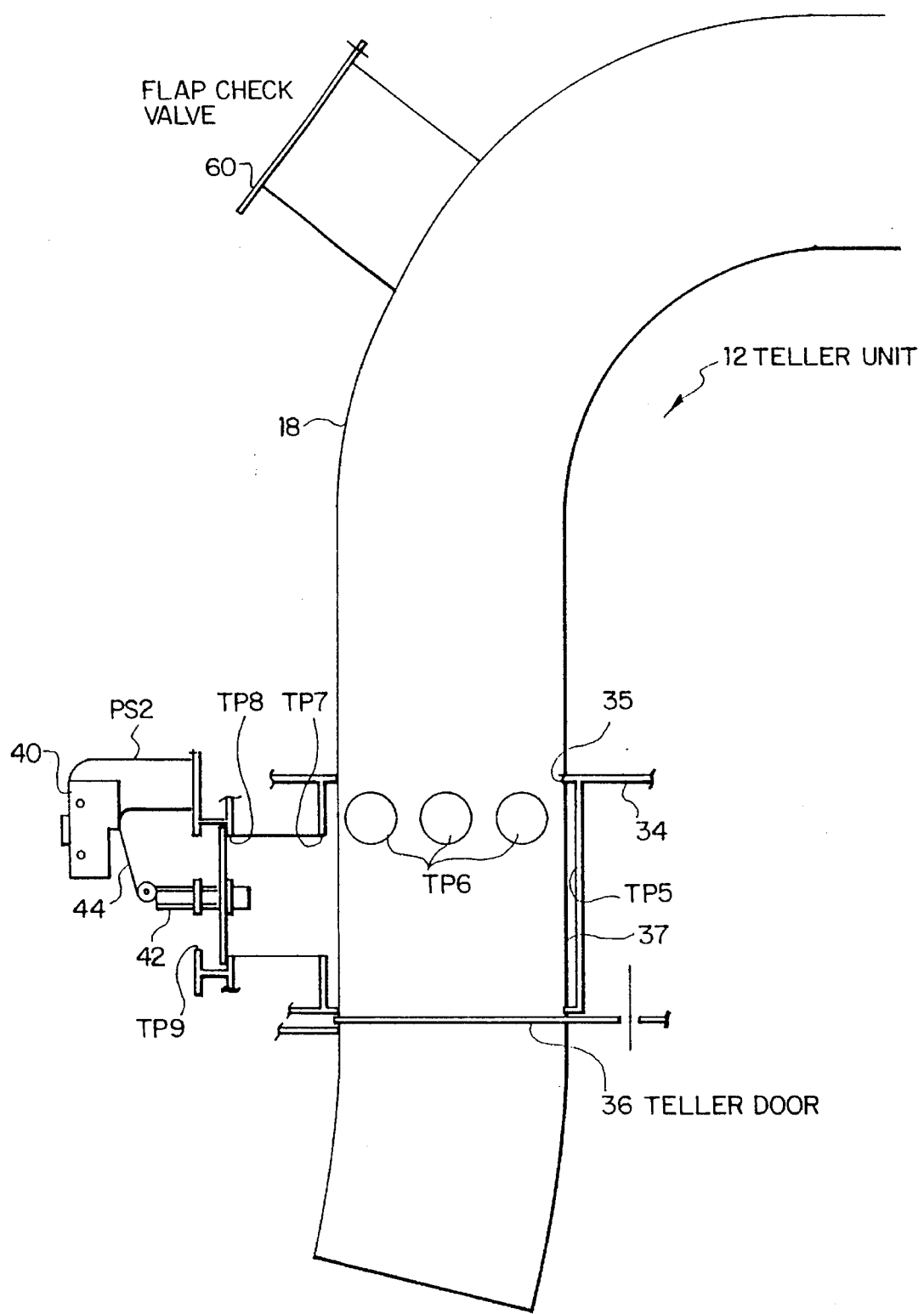
FIG. 2 is a schematic side view showing key elements in the teller station of the exemplary bank teller network shown in FIG. 1.

For either procedure, an authorized person, i.e. a bank employee, activates the master switches SL1, SL2 and then the Night Lock switch to provide power to preferred main control circuit 200. Then, because teller-side pressure switch PS2 is closed and in the position shown in FIG. 9 when system 10 is off, power will be present along line L'i at branch lines L'1a through L'1g. With reference to FIG. 2, the closed position of pressure switch PS2 corresponds to where switch PS2 obstructs port TP8. Now, with the Night Lock switch activated, normally-closed contact CR4a energizes coil CR1. When coil CR1 energizes, it closes normally-open contact CR1a whereby door-open limit switch LS1 applies power to teller door motor MT through its normally-closed contact NC. Motor MT thus opens teller door 36 to the extent permitted by limit switch LS1, whereupon the door stops.

Then, when the teller pushes the Teller Send control (see line L'1f), the contactor coil M1 is energized by current through the closed Teller Send switch, and through normally-closed contact CR3b. Energization of contactor coil M1 latches normally-open contact M1c closed to provide a second connection of coil M1 to power through pressure switch PS1. At the same time, contactor coil M1 closes contact M1d (see FIG. 11) to turn on pump 108 (motor MP), and contact M1b to apply power to nonmovable contact C of vacuum switch VS. Also, at this time, the normally-closed contact M1a of contactor coil M1 opens.

When spool valve assembly 106 and brake check valve CV are in the positions shown in FIGS. 3 and 5, and pump 108 activates, the pump evacuates tube network 18. Pump 108 draws air from tube network 18 in through brake tube connection port 62, brake tube 122, chamber V-4, port V3, chamber V-3, port V2, chamber V-2, port V1, chamber V-1, and hose connector 164 to vacuum region 160. Pump 108 exhausts air drawn in via pressure region 162, hose connector 166, chamber P-1, port P1, chamber P-2, port P2, exhaust chamber 130, and exhaust port 132 to create low pressure conditions in tube 18. Airflow from tube 18 through to vacuum region 160, and exhaust air forced from chamber 130 out of port 132 is represented by bold arrow I in FIGS. 3 and 5. Vacuum switch VS senses low pressure within network 18 whereby it changes position and connects normally-open contact M1*b* and line L16, to line L9 and each of the normally-open contact CR4*c* and the normally-closed contact CR4*d* of coil CR4. Low pressure conditions ensure (a) that pressure switches PS1 and PS2 remain closed, i.e. their plungers remain extended to close their respective ports CP8 and TPS, (b) that flap check valve 60 remains closed, and (c) that spool valve assembly 106 remains in its down position. Also, the flap member 150 of brake check valve CV is held over port P3 to close that port.

As mentioned in the foregoing paragraph, vacuum switch VS changes state under low pressure conditions. The plunger 42 of vacuum switch VS moves to open ports CP9*a* and close ports CP8*a*. When this occurs, current through pressure switch PS1, through contact M1*b*, vacuum switch VS and contact CR4*d* energizes coil CR3. When coil CR3 energizes, it also closes and latches normally-open contact CR3*b*. It also closes normally-open contact CR3*a* to connect coil CR2 to contact M1*a*; however, because contact M1*a* was opened by energization of coil M1, coil CR2 does not energize at this time.

In the state described above, air at atmospheric pressure, entering the teller station 12 behind carrier 16, creates an air stream that moves the carrier toward customer station 14 through the depressurized tube 18. As carrier 16 is moved, customer door 78 is held closed. As such, when the carrier 16 moves past brake tube port 62, it compresses air below it to create pressure at ports CP8*a* and CP8*b*. This pressure actuates pressure switch PS1 by causing it to retract from port CP8*b* to close over port CP9*b*, whereby switch PS1 disconnects branch line L'1*e* from lines L4*a* through L4*d* as its movable contact moves to the NO position. When switch PS1 changes position, contactor coil M1 deenergizes and its contacts M1*b*, M1*c* and M1*d* return to their normally-open, OFF states, while its normally-closed contact M1*a* returns to the normally-closed state. Opening of contact M1*d* thus shuts off pump 108, while closing of contact M1*a* reconnects lines L4*a* and L15 through contact CR3*a* which is closed at this time. The increased pressure between carrier 16 and the closed customer door 78, in addition to operating switch PS1, also acts to brake the speed of the carrier as it approaches the customer door. When carrier 16 finally touches customer door 78, this pressure increase vanishes, whereby switch PS1 resets by extending to close port CP8*b*, thus reconnecting line L'1*e* to line L4 and its branch lines L4*a* through L4*d*. At the same time, current flow through reset switch PS1 and now closed, normally-closed contact M1*a*, and still closed, normally-open contact CR3*a*, energizes coil CR2 to close normally-open contact CR2*b* (and open normally-closed contact CR2*c*), and thereby turn on customer door motor MC. Customer door motor MC operates to open customer door 78 until door-open limit switch LS3 changes state, upon which the customer door stops in its full open position. The other limit switch, LS5 also responds to the fully open position of door 78 by connecting line L6 to line L7. At this point, carrier 16 drops out to the customer.

Energizing of coil CR2 also closes normally-open contact CR2*a* whereby current flow through now closed contact CR2*a* energizes coil CR4. When coil CR4 turns on, it closes and latches its normally-open contact CR4*g*, and its normally-open contact CR4*b* to connect line L'1*c* to lines L4*a*, L4*b*, L4*c*, and L4*d*. It also opens normally-closed contact CR4*f* to isolate coil CR3 from line L6 and thereby inhibit restart of pump 108 when limit switch LS5 connects line L6 to line L7. Further, energized coil CR4 closes it normally-open contact CR4*e* to enable the Customer Send control, opens its normally-closed contact CR4*d* to isolate coil CR3 from line L9, closes its normally-open contact CR4*c* to connect line L9 to coil CR2, and opens its normally-closed contact CR4*f* to denergize coil CR1. It is seen that when coil CR1 denergizes, its previously opened, normally-closed contact CR1*b* returns to the normally-closed state whereby teller door motor MT is driven to close the teller door 36 until limit switch LS2 changes states to stop motor MT.

At this point, system 10 is prepared for "Teller Recall" or "Customer Send". "Teller Recall" and "Customer Send" accomplish the same function, i.e. return of the carrier 16 to teller station 12. The only difference is that "Teller Recall" is initialed by the teller while the customer initiates "Customer Send".

Thus, the Teller Recall/Customer Send operation is initiated when a customer operates the Customer Send control. This temporarily connects line L4*c* and line L8. As described in the foregoing, coil CR4 has remained energized whereby contact CR4*e* is held closed and contactor coil M1 then is energized by the current path through switch PS1, the Customer Send control, contact CR4*e*, and limit switch LS5. When contactor coil M1 energizes, it closes contact M1*c* so that it remains energized after the Customer Send button is released, and it closes contact M1*d* to activate pump motor MP. Energized coil M1 also closes contact M1*b* to connect lines L4*b* and L16. However, coil CR2 turns off momentarily when contact M1*a* opens by energization of coil M1. This causes contact CR2*c* to return to its normally-closed state and thereby activate motor MC to begin closing customer door 78.

With particular attention again to FIG. 3 and with the activation of pump 108, exhaust from the pump flows through hose 166 to chamber P-1, through port P1 to chamber P-2, through port P2, to exhaust chamber 130, and through the exhaust chamber port 132 to the atmosphere. Thus pump 108 again creates low pressure in system 10 by drawing in air through brake tube connection port 62, brake tube 122, chamber V-4, port V3, chamber V-3, port V2, chamber V-2, port V1, chamber V-1, and hose 164 to the vacuum region 160, and by exhausting the drawn-in air from port 132. Reference again is made to bold arrow I in FIGS. 2 and 5. System low pressure conditions hold both pressure switches PS1 and PS2, and therefore ports TP8 and CP8*b*, closed, and flap check valve 60 closed. Low pressure also holds spool valve assembly 106 in its down position, unseats check valve CV, and holds valve disc A-3 over port P3. It also allows air at atmospheric pressure to force carrier 16 out of the customer station back towards teller station 12.

The low pressure conditions also activate vacuum switch VS whereby its arm/disc assembly 42 closes port CP8*a* and it changes state to connect lines L16 and L9 and thereby reenergize coil CR2 through the circuit of contact M1*b*, switch VS, and contact CR4*c*. This reenergization of coil CR2 operates customer door motor MC via contact CR2*b* to re-open door 78 and allow carrier 16 to pass therethrough. Door 78 remains open until carrier 16 passes, whereupon high pressure below the carrier propagates through ports CP6, chamber P-5, port CP7, to port CP8*b* where it causes vacuum switch VS to change state so that the vacuum switch closes ports CP9 and deenergizes coil CR2. Thus, through contact CR2*c*, door motor MC activates to fully close customer door 78.

Figure 7:
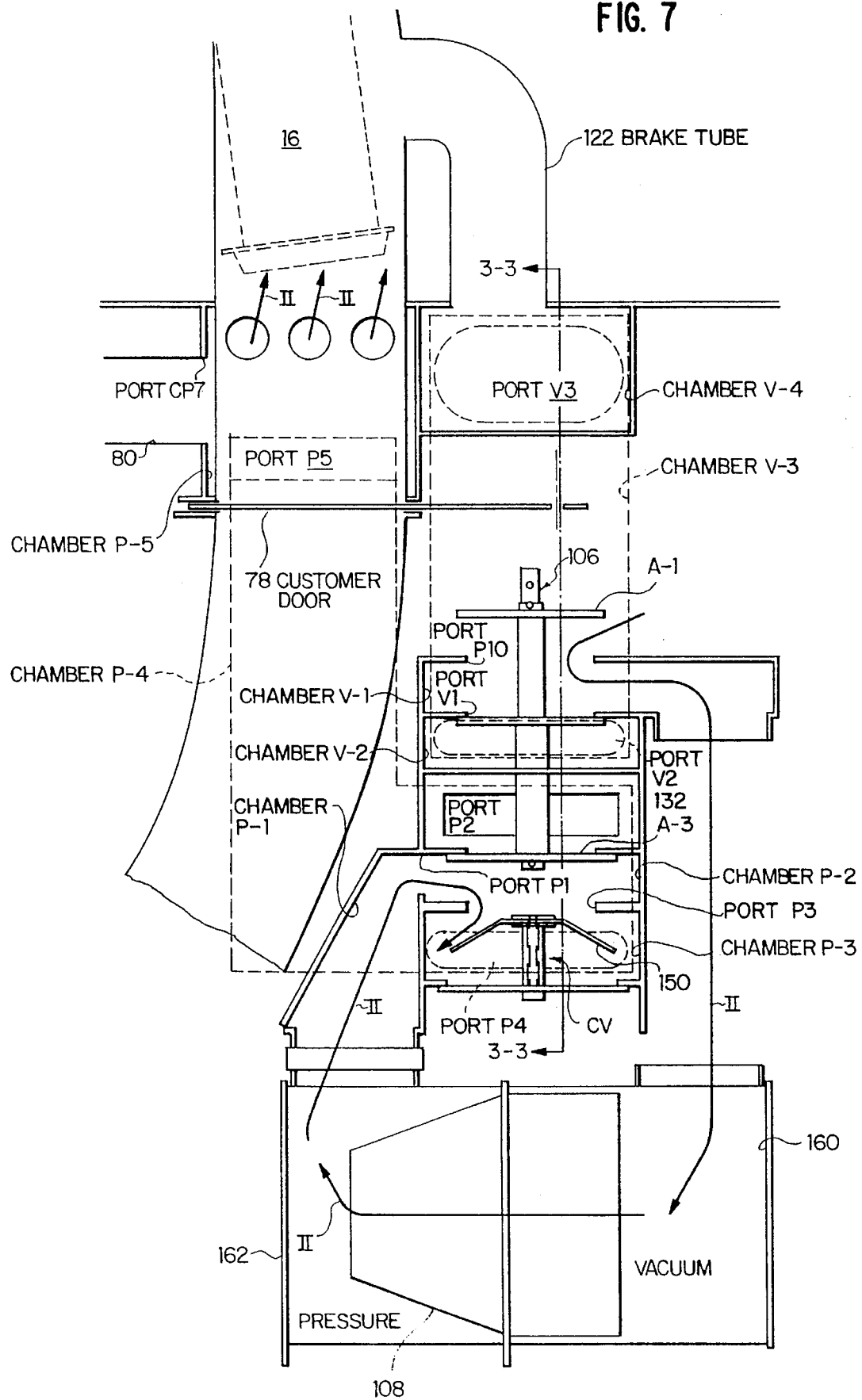
FIG. 7 is a view, similar to FIG. 3, of the customer station equipment when in the system pressurization mode.
Figure 8:
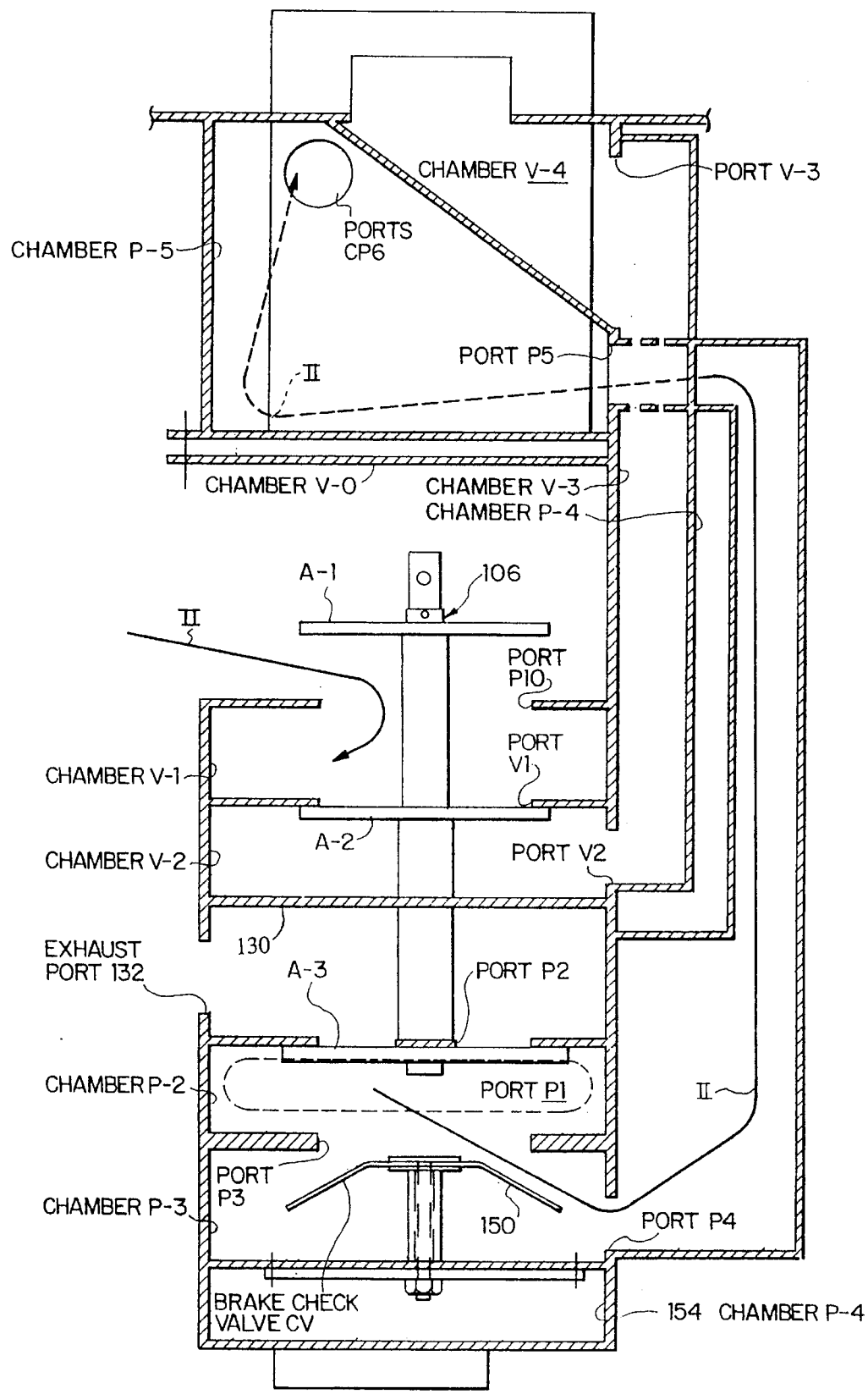
FIG. 8 is a view similar to FIG. 5 and along line 3—3 of FIG. 7 of the customer station pressure generation arrangement during system pressurization.

Customer door 78, being operatively connected to spool valve assembly 106, lifts valve assembly 106 to the valve assembly's up or actuated position when the door closes completely. This permits pump 108 to pressurize system 10. FIGS. 7 and 8 show, in detail, the state where valve assembly 106 is in its up position to configure pressure generation system 100 to pressurize tube network 18 in order to return carrier 16 to the teller station 12. By the time that valve assembly 106 has assumed its up position, carrier 16 will have passed ports CP6.

Pump 108 forces air through hose 166, chamber P-1, port P1, chamber P-2, and port P3 to flex check valve member 150 downwardly into chamber P-3. Bold arrow II represents air flow, under pressure, in FIGS. 7 and 8. Pressurized air flow continues through port P4, chamber P-4, port P5, chamber P-5, ports P6 and into tube 18 below carrier 16 to propel the carrier. Air intake for pump 108 is supplied through port P10, chamber V-1, hose 164, and vacuum region 160. In preferred system 10, it is not necessary that closed customer door 78 continue to hold spool valve assembly 106 in the up position because once the system is pressurized, high pressure will hold valve disc A-3 against port P2.

As carrier 16 returns to the teller station 12, pressure created ahead of the carrier, by the moving carrier, exhausts through flap check valve 60. After carrier 16 passes by valve 60, it creates pressure on the teller side, beneath valve 60, which pressure actuates pressure switch PS2 through teller-side ports TP6, chamber TP5 and ports TP7, and port TP8. This pressure moves plunger 42 of switch PS2 to retract from port TP8 and close port TP9 whereby switch PS2 disconnects line L'1a from line L7. Switch PS2 thus turns off coils CR2, CR3, CR4 and M1 (coil CR1 was turned off previously) and closes the teller door 36 by activating door motor MT through contact CR1b. When contactor coil M1 denergizes, contact M1d opens to cut off pump 108. With the denergization of coil CR4, its contact CR4a returns to its normally-closed state to connect lines L'1 and L3. Then, when carrier 16 touches teller door 36 and pressure in front of the carrier vanishes, switch PS2 resets to reconnect line L'1a to line L7 and thereby turn on coil CR1. Reenergized coil CR1 activates teller door motor MT by closing contact CR1a whereupon the carrier 16 drops out to the teller.

Development of preferred system 10 contemplated the possibility of power failures and the attendant interruption of service. Preferred system 10 has "built-in" capability to reset and return the carrier to the teller following a power outage. If a power failure were to occur while the carrier 16 was present at teller station 12, the procedure is simple. The teller need only turn off the Night Lock and then turn on the Night Lock, and thereafter operate the Teller Send control. The following details Teller Recall when, during power failure, the carrier 16 was other than at teller station 12.

When, following a power outage, the carrier is located either above or below customer door 78 within station 14, the teller likewise turns off the Night Lock, then turns on the Night Lock, and Teller Recall, in this order. This turns on coil CR3 through switch PS2, the Teller Recall control, and contact CR4f. When coil CR3 energizes, it turns on coil CR2 through switch PS1, contact M1a, and contact CR3a. Energized coil CR2 activates customer door motor MC through contact CR2b whereupon the carrier is available to the customer. At the same time, contact CR2a energizes coil CR4, which latches on via contact CR4g and closes contact CR4b to connect line L'1c to branches L4a through L4d. Thus, contact CR4f isolates coil CR3 from line L6 to inhibit pump 108 when switch LS5 connects lines L6 and L7. Also, contact CR4e closes to enable Customer Send, contact CR4d opens to isolate coil CR3 from line L9, contact CR4c connects line L9 to coil CR2, and contact CR4a opens to deenergize coil CR1. Thus, the teller door 36 closes because of the return of contact CR1b to its normally-closed state.

At this point, system 10 is ready for Customer Send. The teller presses the Customer Send control. This temporarily connects line L4c and line L8. Coil CR4 has remained energized whereby contact CR4e is held closed and contactor coil M1 is energized by the current path through switch PS1, the Customer Send control, contact CR4e, and limit switch LS5. When contactor coil M1 energizes, it latches contact M1c, and closes contact M1d to activate pump motor MP, and closes contact M1b to connect lines L4b and L16. As noted in the foregoing, coil CR2 turns off momentarily when contact M1a opens by energization of coil M1, whereby contact CR2c closes to activate motor Mc and close customer door 78.

At this time, pump 108 depressurizes system 10 to hold check valve 60 closed. Low pressure also holds spool valve assembly 106 in its down position. Due to atmospheric pressure below it, carrier 16 begins to move back towards teller station 12. The low pressure conditions in front of carrier 16 activate vacuum switch VS whereby it changes state to connect lines L16 and L9 and reenergize coil CR2 through contact M1d, switch VS, and contact CR4c. This operates customer door motor MC via contact CR2b to re-open door 78. Door 78 remains open until the carrier passes by and then high pressure below the carrier propagates through ports CP6, chamber P-5, port CP7, to port CP8b where it causes vacuum switch VS to change state so that it closes ports CP9a and denergizes coil CR2, and fully closes customer door 78. Customer door 78 in turn lifts valve assembly 106 to the valve assembly's up position, when the door closes completely, to cause pressurization in order to return carrier 16 to the teller station 12.

As described hereinabove, as carrier 16 returns to the teller station 12, pressure ahead of the carrier actuates pressure switch PS2 to disconnect line L'1 from line L7. Switch PS2 thus turns off coils CR2, CR3, CR4 and M1. When contactor coil M1 denergizes, contact M1d opens to cut off pump 108. With the denergization of coil CR4, its contact CR4a returns to its normally-closed state to connect lines L'1b and L3. When carrier 16 touches teller door 36, switch PS2 resets to reconnect line L'1 to line L7 and turn on coil CR1 and activate the teller door motor MT to open the door 36 and drop the carrier 16.

The third possibility is where carrier 16 is caught between stations 12 and 14. In this case, the teller again turns off and then turns on Night Lock, and then presses the Teller Recall control to energize coil CR3. Then, the procedure for the carrier located at customer station 14 repeats. Coil CR3 energizes, and turns on coil CR2 through switch PS1, contact M1a, and contact CR3a. Energized coil CR2 activates customer door motor MC through contact CR2b so that the carrier is available. Contact CR2a energizes coil CR4 to latch on via contact CR4g and close contact CR4b to connect line L'1d to branches L4a through L4d. Contact CR4f isolates coil CR3 from line L6 to inhibit pump 108 when switch LS5 connects lines L6 and L7. Contact CR4d opens to isolate coil CR3 from line L9, and contact CR4c connects line L9 to coil CR2, and contact CR4a opens to denergize coil CR1. Thus, the teller door 36 closes because of the return of contact CR1b to its normally-closed state.

Now, the teller operates the Teller Recall control a second time. Contactor coil M1 energizes through the Teller Recall switch and limit switch LS5, and latches on by contact M1c. Pump 108 activates via contact M1d, and contact M1b connects lines L4b and L16. Then coil CR2 denergizes when contact M1a opens. Customer door 78 closes completely when coil CR2 turns off. Door 78 lifts valve assembly 106 to the valve assembly's up position when the door closes completely to cause system pressurization to return carrier 16 to the teller station 12.

Again, the carrier 16 returns to the teller station 12, and pressure ahead of the carrier actuates pressure switch PS2 to disconnect line L'1 from line L7 and turn off coils CR2, CR3, CR4 and M1. Teller door 36 closes with activation of door motor MT through contact CR1b. Coil M1 denergizes and contact M1d opens to cut off pump 108. With the denergization of coil CR4, its contact CR4a returns to its normally-closed state to connect lines L'1b and L3. Carrier 16 touches teller door 36 and then switch PS2 resets to reconnect line L'1a to line L7 and turn on coil CR1. The teller door motor MT activates to open the door 36 and drop the carrier 16.

From the foregoing, it is seen that system 10 achieves a complete bi-directional conveyance system that self-configures air channels through its section 100 and thereby relies upon only one pneumatic pumping source, pump 108. Further, the inventive system relies upon sensing of carrier entry into the terminal stations 12, 14 and of carrier position within the stations to effect control over the pneumatic source, the station doors, and the internal arrangement of the section 100 in order to convey the carrier and make it available to the teller/customer. This control extends to retrieving the carrier after a power outage, irrespective of carrier position within the system. The disclosed invention also includes a terminal for such a conveyance system, a pressure generator therefor, and a controllable apparatus therefor.

It is to be understood that there can be various changes and modifications to the preferred embodiments of the present invention disclosed herein, which changes and/or modifications may be made by one of ordinary skill in the art, but such would still result in a system well within the scope of the invention as set forth in the claims.

What is claimed is:

1. A terminal station for use in a pneumatic conveyance system including plural stations and a tube network connecting its stations, said terminal station comprising:

a housing having an interior structure for receiving a carrier from the tube network of a pneumatic conveyance system, said interior structure defining an area which is in communication with the tube network and which undergoes pressure increases therein as the carrier enters said area from the tube network, and pressure decreases as the carrier passes through said area;

high and low pressure generation means connectable to the tube network and to a single pneumatic source for selectively depressurizing and pressurizing the tube network in order to convey the carrier therein;

sensor means for sensing pressure within said area and providing an indication thereof, and control means, responsive to an indication from said sensor means, for controlling said pressure generation means and the pneumatic source so as to depressurize and pressurize the tube network.

2. A terminal station as claimed in claim 1, wherein said sensor means includes a first sensor responsive to relatively high pressure conditions within said area, and a second sensor responsive to relatively low pressure conditions within said area.

3. A terminal station as claimed in claim 2, wherein said housing interior structure defines a passage which provides communication between said sensors and said area, and wherein said sensors each include a movable arm and disc assembly exposed within said passage.

4. A terminal station as claimed in claim 1, wherein said pressure generation means includes a single pump as said single pneumatic source, and valve means for internally arranging said pressure generation means to selectively depressurize and pressurize the tube network according to the position of said valve means.

5. A terminal station as claimed in claim 4, wherein said pressure generation means has interior sectional walls which define a pressurization channel including a plurality of pressure chambers, and a vacuum channel, separate from said pressurization channel and including a plurality of vacuum chambers, said pressurization channel being connected to a pressurization side of said pump, and said vacuum channel being connected to a vacuum side of said pump.

6. A terminal station as claimed in claim 5, wherein said interior sectional walls define said pressurization channel to have a first pressure chamber in communication with said area, a second pressure chamber in communication with said first chamber, a third pressure chamber in communication with said second chamber, a fourth pressure chamber that is connectable to said third pressure chamber through a first pressure port, an exhaust chamber that is connectable to said fourth pressure chamber through a second pressure port, and a fifth pressure chamber adapted to connect said pressurization side of said pump to said exhaust chamber through a third pressure port; and wherein said interior sectional walls define said vacuum channel to have a first vacuum chamber connectable to the tube network, a second vacuum chamber in communication with said first vacuum chamber, a third vacuum chamber in communication with said second vacuum chamber, a fourth vacuum chamber connectable to said third vacuum chamber through a first vacuum port, and a fifth vacuum chamber connectable to said fourth vacuum chamber through a second vacuum port, said fifth vacuum chamber being in communication with said vacuum side of said pump; and wherein said valve means includes plural valve elements, said valve means having a first position in said pressure generation means wherein a first valve element thereof obstructs said second vacuum port, and a third valve element thereof obstructs said first pressure port, and a second position wherein said first valve element opens said second vacuum port, a second valve element thereof obstructs said first vacuum port, and said third valve element obstructs said third pressure port, whereby, when said pump is operating, said pressure generation means causes the tube network to depressurize if said valve means in said first position, and said pressure generation means causes the tube network to pressurize if said valve means is in said second position.

7. A terminal station as claimed in claim 6, wherein said valve means is a spool valve assembly including a stem that connects at least two of said first, second and third valve elements, each of said valve elements being a valve disc.

8. A terminal station as claimed in claim 7, wherein said pressure generation means further includes another valve means located in said third pressure chamber, said another valve means obstructing said first pressure port when said spool valve assembly is in its first position and said another valve means opening said first pressure port in response to air pressure present at said first pressure port when said spool valve assembly is in its second position.

9. A terminal station as claimed in claim 4, wherein said sensor means includes a first sensor responsive to relatively high pressure conditions within said area, and a second sensor responsive to relatively low pressure conditions within said area;

wherein said housing interior structure defines a passage which provides communication between said sensors and said area, and wherein said sensors each include an arm and disc assembly exposed within said passage; and wherein said pressure generation means has interior sectional walls which define a pressurization channel including a plurality of pressure chambers, and a vacuum channel, separate from said pressurization channel, and including a plurality of vacuum chambers, said pressurization channel being connected to a pressurization side of said pump, and said vacuum channel being connected to a vacuum side of said pump.

10. A terminal station as claimed in claim 9, wherein said interior sectional walls define said pressurization channel to have a first pressure chamber in communication with said area, a second pressure chamber in communication with said first chamber, a third pressure chamber in communication with said second chamber, a fourth pressure chamber that is connectable to said third pressure chamber through a first pressure port, an exhaust chamber that is connectable to said fourth chamber through a second pressure port, and a fifth pressure chamber adapted to connect said pressurization side of said pump to said exhaust chamber through a third pressure port; and wherein said interior sectional walls define said vacuum channel to have a first vacuum chamber connectable to the tube network, a second vacuum chamber in communication with said first vacuum chamber, a third vacuum chamber in communication with said second vacuum chamber, a fourth vacuum chamber connectable to said third vacuum chamber through a first vacuum port, and a fifth vacuum chamber connectable to said fourth vacuum chamber through a second vacuum port, said fifth vacuum chamber being in communication with said vacuum side of said pump; and wherein said valve means includes a spool valve assembly including valve discs, said spool valve assembly having a first position in said pressure generation means wherein a first valve disc thereof obstructs said second vacuum port, and a third valve disc thereof obstructs said first pressure port, and a second position wherein said first valve disc opens said second vacuum port, a second valve disc thereof obstructs said first vacuum port, and said third valve disc obstructs said third pressure port, whereby when said pump is operating, said pressure generation means causes the tube network to depressurize if said spool valve assembly in said first position, and said pressure generation means causes the tube network to pressurize if said spool valve assembly is in said second position.

11. A terminal station as claimed in claim 4, wherein said control means comprises:

a manually operable element; and circuit means for selectively actuating said pump, said circuit means including a first switch means controlled by said manually operable element for connecting said pump to a power source to activate said pump, and second switch means responsive to said indication from said sensor means for disconnecting said pump from the power source to deactivate said pump.

12. A terminal station as claimed in claim 11, wherein said housing has a door means for permitting access to the carrier when the carrier is received within said interior structure, said first switch means including means causing opening of said door, and said second switch means including means for causing closing of said door.

13. A terminal station as claimed in claim 12, wherein said second switch means includes means for arranging said valve means to depressurize the tube network when said station is to receive the carrier, and to pressurize the tube network when said station is to send the carrier.

14. A terminal station as claimed in claim 13, wherein, in order to send the carrier, said circuit means causes said pump and said valve means to cooperate to first depressurize the tube network above the carrier in order to permit atmospheric pressure to move the carrier out of said interior structure, and then to cooperate to pressurize the tube network in order to convey the carrier to another terminal station.

15. A terminal station as claimed in claim 14, wherein said circuit means comprises multi-contact relays, the energization of which are controlled by said first and second switch means.

16. A terminal station as claimed in claim 15, wherein said circuit means is arranged to automatically send the carrier to another station, irrespective of the position of the carrier, in response to a predetermined manner of operation of said manually operable element.

17. A terminal station as claimed in claim 16, wherein said terminal is a bank pneumatic conveyance system terminal.

18. A pneumatic conveyance system for conveying an item between stations of said system, said system comprising:

a first station having a first interior structure that defines a first area to receive and hold the item;

a first pressure sensor for sensing pressure within said first area and providing an indication indicative thereof;

a second station having a second interior structure that defines a second area to receive and hold the item;

a second pressure sensor for sensing pressure within said second area and providing an indication indicative thereof;

a pneumatic tube network for connecting said first and second stations;

a pressure generation means connectable to said tube network at said second station for depressurizing and pressurizing said tube network, said pressure generation means including a pneumatic source and valve means for internally arranging said pressure generation means to depressurize said tube network when said pneumatic source is activated and said valve means is in a first position, and for internally arranging said pressure generation means to pressurize said tube network when said pneumatic source is activated and said valve means is in a second position; and control means, responsive to pressure indications from said first and second pressure sensors, for controlling said pneumatic source and said valve means of said pressure generation means in order to selectively depressurize and pressurize said tube network.

19. A terminal station as claimed in claim 18, wherein said pneumatic source is a single pump; and wherein said pressure generation means has interior sectional walls which define a pressurization channel including a plurality of pressure chambers, and a vacuum channel, separate from said pressurization channel, and including a plurality of vacuum chambers, said pressurization channel being connected to a pressurization side of said pump, and said vacuum channel being connected to a vacuum side of said pump.

20. A pneumatic conveyance system as claimed in claim 19, wherein said interior sectional walls define said a pressurization channel to have a first pressure chamber in communication with said second area, a second pressure chamber in communication with said first chamber, a third pressure chamber in communication with said second chamber, a fourth pressure chamber that is connectable to said third pressure chamber through a first pressure port, an exhaust chamber that is connectable to said fourth chamber through a second pressure port, and a fifth pressure chamber adapted to connect said pressurization side of said pump to said exhaust chamber through a third pressure port; and wherein said interior sectional walls define said vacuum channel to have a first vacuum chamber connectable to said tube network, a second vacuum chamber in communication with said first vacuum chamber, a third vacuum chamber in communication with said second vacuum chamber, a fourth vacuum chamber connectable to said third vacuum chamber through a first vacuum port, and a fifth vacuum chamber connectable to said fourth vacuum chamber through a second vacuum port, said fifth vacuum chamber being in communication with said vacuum side of said pump; and wherein said valve means includes a spool valve assembly including valve discs, said spool valve assembly having a first position in said pressure generation means wherein a first valve disc thereof obstructs said second vacuum port, and a third valve disc thereof obstructs said first pressure port, and a second position wherein said first valve disc opens said second vacuum port, a second valve disc thereof obstructs said first vacuum port, and said third valve disc obstructs said third pressure port, whereby, when said pump is operating, said pressure generation means causes the tube network to depressurize if said spool valve assembly in said first position, and said pressure generation means causes the tube network to pressurize if said spool valve assembly is in said second position.

21. A pneumatic conveyance system as claimed in claim 18, wherein said tube network includes a brake tube for connecting said pressure generation means to said network, said brake tube being located above said second area of said second station, and a pressure-responsive valve, located above said first area of said first station.

22. A pneumatic conveyance system as claimed in claim 18, further comprising a vacuum sensor for sensing low pressure conditions within said second area and providing an indication indicative thereof; said control means further being responsive to indications from said vacuum switch for controlling said pump and said valve means.

23. A pneumatic conveyance system as claimed in claim 18, wherein said control means includes circuit means, said circuit means including:

means for activating said pump and causing said valve means to assume its first position to depressurize said tube network in response to an operator command (a) to send the carrier from said first station to said second station or (b) to send the carrier from said second station to said first station;

means for activating said pump and causing said valve means to assume its second position to pressurize said tube network in response to an operator command to send the carrier from said second station to said first station; and means responsive to said first and second sensors for deactivating said pump as the carrier arrives within said area of one of said first and second stations.

24. A pneumatic conveyance system as claimed in claim 23, wherein said first station has a first door means for providing access to said first area and said second station has a second door means for providing access to said second area, and wherein said control means further includes means responsive to an operator command to convey the carrier and to said sensors, for selectively opening and closing each of said door means.

25. A pneumatic conveyance system as claimed in claim 24, wherein said circuit means is arranged to automatically send the carrier to another station, irrespective of the position of the carrier, in response to a predetermined manner of operation of said manually operable element.

26. A pneumatic conveyance system as claimed in claim 25 wherein said system is a drive-up bank teller carrier conveyance system.

27. Pressure generation apparatus for use in a pneumatic conveyance system including plural stations and a tube network connecting the stations, said apparatus comprising:

means defining a first enclosed area;

means providing communication between said first enclosed area and a location in one of the stations, which location receives and holds a conveyance item;

means for sensing pressure in said enclosed area and providing an output signal indicative thereof;

means defining a second enclosed area;

valve means located in said second enclosed area and movable therein between a first position and a second position;

means defining a third enclosed area which communicates with said second enclosed area and which is communicable with said first enclosed area through said valve means;

a single pump means located in said third enclosed area; and control circuit means, responsive to an output signal from said sensing means, for controlling activation of said pump means and movement of said valve means between said first and second positions to selectively depressurize and pressurize a tube network connected to the said one of the stations.

28. A pressure generation apparatus as claimed in claim 27, wherein said sensor means includes a pressure sensor and a vacuum sensor.

29. A pressure generation apparatus as claimed in claim 27, wherein said pressure generation means has interior sectional walls which define:

a pressurization channel including a first pressure chamber in communication with said area, a second pressure chamber in communication with said first chamber, a third pressure chamber in communication with said second chamber, a fourth pressure chamber that is connectable to said third pressure chamber through a first pressure port, an exhaust chamber that is connectable to said fourth chamber through a second pressure port, and a fifth pressure chamber adapted to connect a pressure side of said pump to said exhaust chamber through a third pressure port; and a vacuum channel separate from said pressurization channel and including a first vacuum chamber connectable to the tube network, a second vacuum chamber in communication with said first vacuum chamber, a third vacuum chamber in communication with said second vacuum chamber, a fourth vacuum chamber connectable to said third vacuum chamber through a first vacuum port, and a fifth vacuum chamber connectable to said fourth vacuum chamber through a second vacuum port, said fifth vacuum chamber being in communication with a vacuum side of said pump; and wherein said valve means includes a spool valve assembly including a stem and valve discs mounted to said stem, said spool valve assembly having a first position in said pressure generation means wherein a first valve disc thereof obstructs said second vacuum port, and a third valve disc thereof obstructs said first pressure port, and a second position wherein said first valve disc opens said second vacuum port, a second valve disc thereof obstructs said first vacuum port, and said third valve disc obstructs said third pressure port, whereby, when said pump is operating, said pressure generation means causes the tube network to depressurize if said spool valve assembly in said first position, and said pressure generation means causes the tube network to pressurize if said spool valve assembly is in said second position.

30. A pressure generation apparatus as claimed in claim 29, wherein said pressure generation means further includes another valve means located in said third pressure chamber, said another valve means obstructing said first pressure port when said spool valve assembly is in its first position and said another valve means opening said first pressure port in response to air pressure present at said first pressure port when said spool valve assembly is in its second position.

31. A pressure generation apparatus as claimed in claim 27, wherein said circuit means includes means for causing said pump and said valve means to cooperate to first depressurize the tube network above the carrier whereby atmospheric pressure introduced through the said one of said stations lifts the carrier, and then to cooperate to pressurize the tube network to convey the carrier.

32. Controllable apparatus for directing airflow from a single pneumatic pumping source to selectively depressurize and pressurize the tube network of a bi-directional pneumatic transportation system that includes terminal stations, said apparatus comprising:

housing means, said housing means having an outlet connectable to a bi-directional pneumatic transportation system station, said housing means defining a pressurization channel provided by a first plurality of chambers and ports therebetween, a vacuum channel provided by a second plurality of chambers and ports, and an exhaust chamber connectable to at least one of said chambers of said pressurization channel, said pressurization and vacuum channels being connectable to pressure and vacuum sides of the said single pneumatic pumping source respectively; and valve means located in said housing, said valve means having a first condition wherein it connects said at least one pressurization channel chamber to said exhaust chamber and isolates another pressurization channel chamber from said at least one chamber, and wherein it connects all of said vacuum channel chambers in communication whereby said apparatus cooperates with the single pneumatic pumping source to create a vacuum at said outlet by discharging air through said exhaust chamber, and a second condition wherein it isolates said at least one pressurization channel chamber from said exhaust chamber and connects said at least one pressurization channel chamber and said another pressurization channel chamber, and wherein it isolates at least two of said vacuum channel chambers from each other whereby said apparatus cooperates with the single pneumatic pumping source to create pressure at said outlet said housing means defining said pressurization channel to have a first pressurization channel chamber adapted to be placed in communication with an area in a terminal station, which station receives a carrier, a second pressurization channel chamber in communication with said first pressurization channel chamber, a third pressurization channel chamber in communication with said second pressurization channel chamber, a fourth pressurization channel chamber that is connectable to said third pressurization channel chamber through a first pressure port, an exhaust chamber that is connectable to said fourth pressurization channel chamber through a second pressure port, and a fifth pressurization channel chamber adapted to connect the said pressure side of the said single pneumatic pumping source to said exhaust chamber through a third pressure port, said fourth pressurization channel chamber being said at least one pressurization channel chamber and said third pressurization channel chamber being said another pressurization channel chamber; and said vacuum channel to have a first vacuum channel chamber connectable to the said tube network, a second vacuum channel chamber in communication with said first vacuum channel chamber, a third vacuum channel chamber in communication with said second vacuum channel chamber, a fourth vacuum channel chamber connectable to said third vacuum channel chamber through a first vacuum port, and a fifth vacuum channel chamber connectable to said fourth vacuum channel chamber through a second vacuum port, said fifth vacuum channel chamber being in communication with said vacuum side of the said single pneumatic pumping source said, at least two isolatable of said vacuum channel chambers being said third vacuum channel chamber and said fourth vacuum channel chamber;

wherein said valve means includes first, second, and third valve elements, and in said first condition of said valve means, said first valve element obstructs said second vacuum port, and said third valve element obstructs said first pressure port, and in said second condition of said valve means, said first valve element opens said second vacuum port, said second valve element obstructs said first vacuum port, and said third valve element obstructs said third pressure port.

33. A controllable apparatus as claimed in claim 32, wherein said valve means includes a spool valve assembly including a stem that connects at least two of said first, second and third valve elements together, said valve elements each being a valve disc.

34. A controllable apparatus as claimed in claim 33, wherein said valve means includes a check valve located in said third pressure chamber, said check valve means obstructing said first pressure port when said spool valve assembly is in its first condition and said check valve means opening said first pressure port in response to air pressure present at said first pressure port when said spool valve assembly is in its second condition.

* * * * *